(12) United States Patent
Bouche

(10) Patent No.: US 11,284,720 B2
(45) Date of Patent: Mar. 29, 2022

(54) TABLE GLIDE SPACER

(71) Applicant: Krueger International, Inc., Green Bay, WI (US)

(72) Inventor: Timothy J. Bouche, Green Bay, WI (US)

(73) Assignee: Krueger International, Inc., Green Bay, WI (US)

( * ) Notice: Subject to any disclaimer, the term of this patent is extended or adjusted under 35 U.S.C. 154(b) by 406 days.

(21) Appl. No.: 16/661,296

(22) Filed: Oct. 23, 2019

(65) Prior Publication Data

US 2021/0120953 A1    Apr. 29, 2021

(51) Int. Cl.
   *A47B 91/06*        (2006.01)
   *B60B 33/00*        (2006.01)
   *A47B 91/02*        (2006.01)

(52) U.S. Cl.
   CPC ............ *A47B 91/06* (2013.01); *A47B 91/026* (2013.01); *B60B 33/0007* (2013.01); *B60B 33/0021* (2013.01)

(58) Field of Classification Search
CPC combination set(s) only.
See application file for complete search history.

(56) References Cited

U.S. PATENT DOCUMENTS

| | | | |
|---|---|---|---|
| 2,155,829 A | 11/1937 | Herold | |
| 2,454,739 A | 1/1948 | Hendrickson | |
| 3,150,853 A * | 9/1964 | Lisbin | A47B 91/024 248/188.4 |
| 3,869,105 A | 3/1975 | Daniels | |
| 4,662,591 A * | 5/1987 | Encontre | A47B 13/021 108/158 |
| 4,731,900 A * | 3/1988 | Frobose | B60B 33/0002 16/38 |
| 6,354,231 B1 | 3/2002 | Morris | |
| 6,547,264 B1 * | 4/2003 | Blackburn | B62B 5/00 108/144.11 |
| 6,701,570 B2 | 3/2004 | Henriott et al. | |
| 6,711,985 B1 * | 3/2004 | Doyle | A47B 51/00 248/188.5 |
| 7,159,829 B1 | 1/2007 | Finkelstein | |
| 7,168,373 B1 * | 1/2007 | Hock | A47B 9/14 108/147.11 |
| 7,404,232 B2 | 7/2008 | Chase | |

(Continued)

*Primary Examiner* — Monica E Millner
(74) *Attorney, Agent, or Firm* — Andrus Intellectual Property Law, LLP

(57) ABSTRACT

A table leg assembly for supporting a table top. The table leg assembly includes a leg member having a lower end that defines an open interior. A tube end insert is received within the open interior at the lower end of each of the leg members. A threaded internal opening of the tube end insert receives an attachment rod of either a caster wheel assembly or a glide assembly. The glide assembly includes a glide member having a support foot mounted to the threaded attachment rod. A spacer is positioned along the attachment rod between the lower end of the leg member and the support foot. The spacer is movable along the attachment rod to cover the threaded attachment rod and lock the glide member in position. The attachment rod of the caster wheel assembly is received within the tube end insert to mount the caster wheel assembly to the leg member.

19 Claims, 3 Drawing Sheets

(56) References Cited

U.S. PATENT DOCUMENTS

| | | | |
|---|---|---|---|
| 7,798,455 B2 * | 9/2010 | Kumazawa | A47B 3/0815 |
| | | | 248/188.2 |
| 9,523,381 B1 | 12/2016 | Carpinella et al. | |
| 2005/0156086 A1 | 7/2005 | Patterson et al. | |
| 2009/0146023 A1 | 7/2009 | Finkelstein | |
| 2016/0348706 A1 * | 12/2016 | Carpinella | B60B 33/001 |
| 2017/0238729 A1 * | 8/2017 | Rivera, Jr | A47F 10/06 |

* cited by examiner

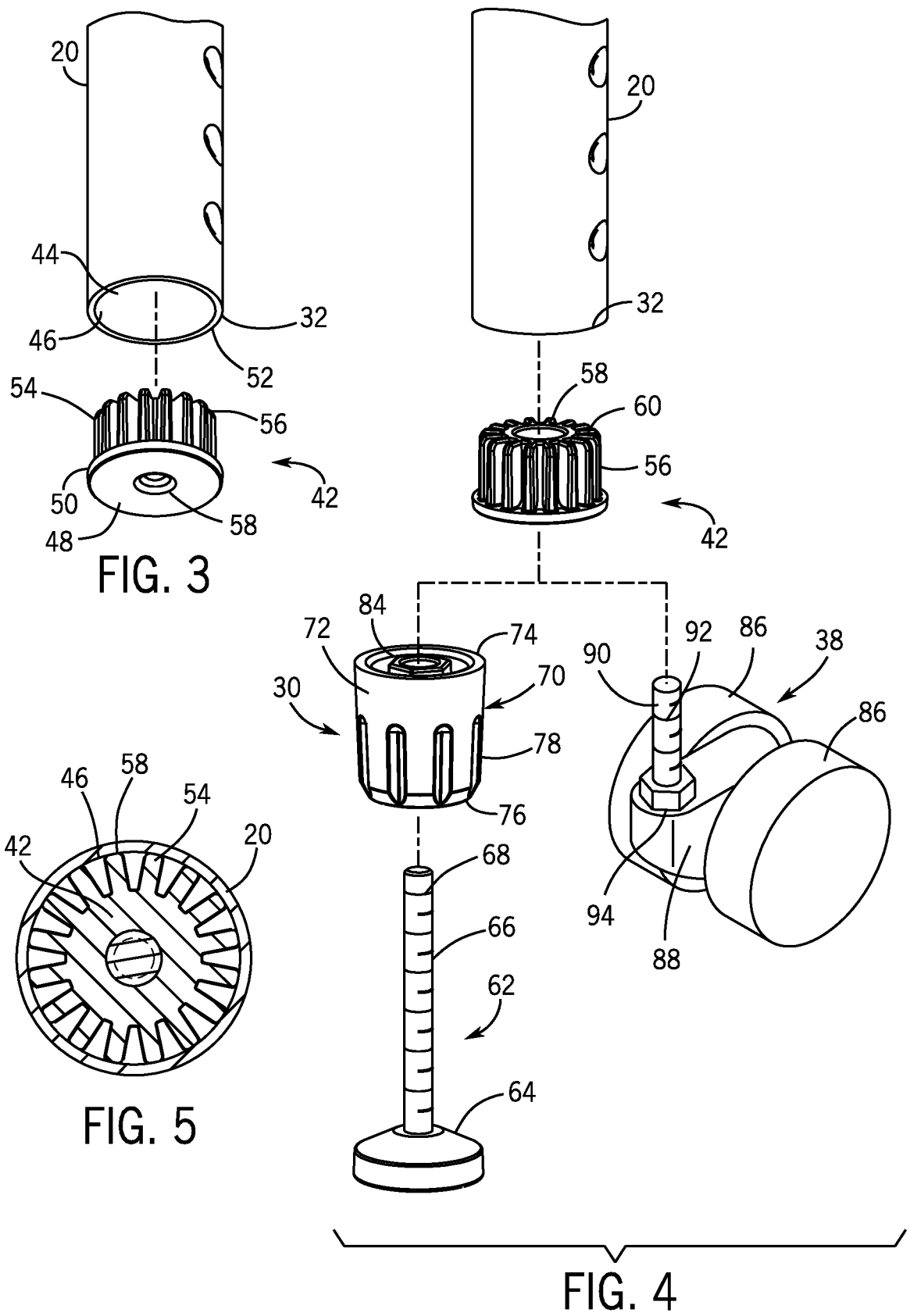

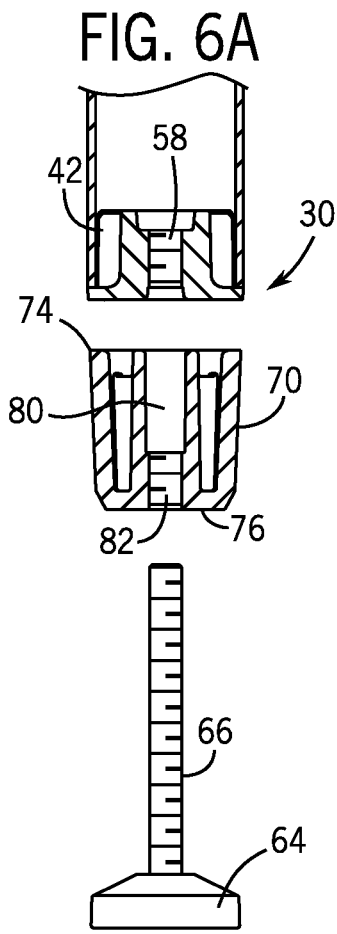
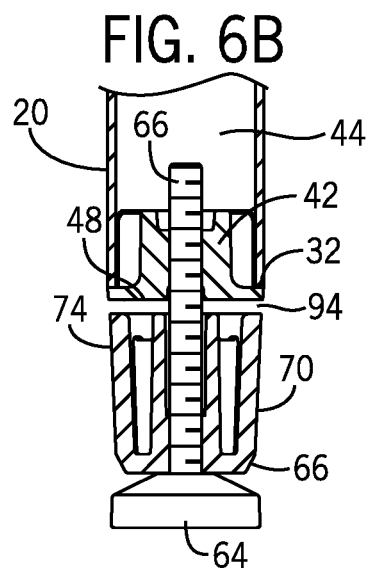
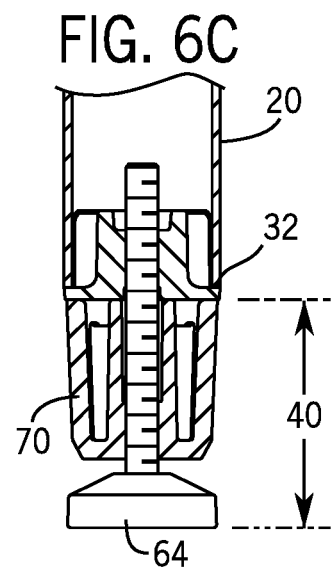
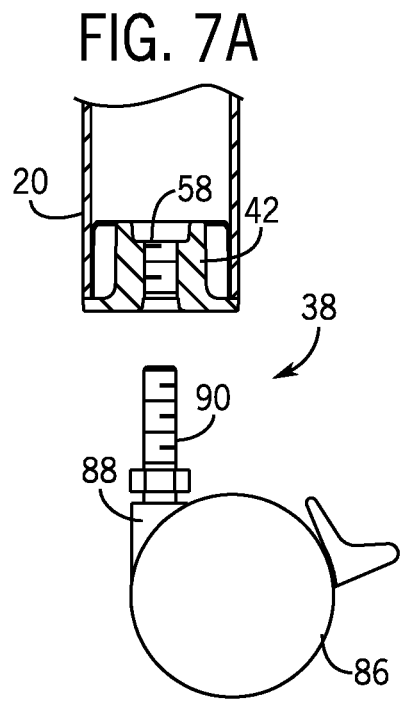
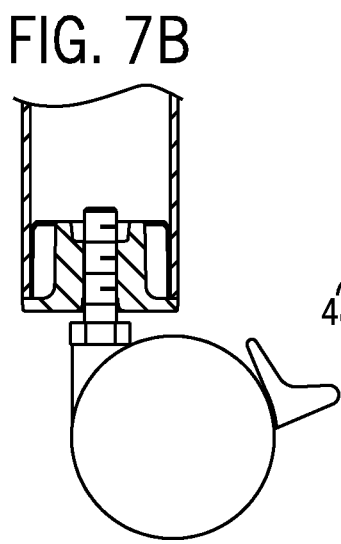
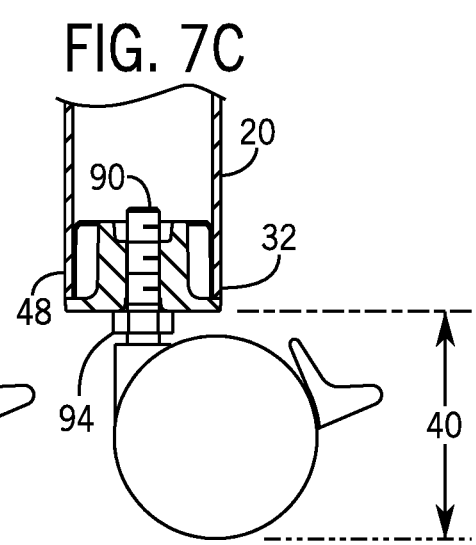

TABLE GLIDE SPACER

BACKGROUND

The present disclosure generally relates to a table leg assembly for supporting a table top above a floor. More specifically, the present disclosure relates to a table leg assembly that can be used with either a caster wheel or an adjustable glide, which can each be selectively removed and replaced.

To improve the usability of tables, many table legs include an adjustment mechanism that allows the length of the leg assembly, and thus the height of the table above a floor, to be adjusted. Such height adjustment mechanisms typically include a foot that is threadedly received in the table leg. The foot can be rotated to adjust the overall length of the table leg.

In other table leg configurations, a caster wheel is mounted to the lower end of the table leg to allow the table to move along a floor. The addition of a caster wheel often times modifies the length of the table leg relative to a table leg including only the height adjustment assembly. Thus, two of the same types of table, one supported by caster wheels and the other supported by the height adjustment assembly, may not be able to be used adjacent to each other to create a single height work surface because of the differences between the lengths of each table leg.

It is desirable to provide tables having a common height such that different tables can be used together to create adjustable and configurable work surfaces. In such embodiments, some of the tables may be supported by non-castered legs while other tables may be supported by castered legs. Thus, it is desirable to create a mounting assembly that allows both a caster wheel and a glide to be used in the same table types and in different legs of each of the table types.

SUMMARY

The present disclosure relates to a table leg assembly that allows a table to include either a table glide or a caster wheel. More specifically, the present disclosure relates to a table leg assembly that allows a glide assembly and caster wheel assembly to be selectively removed and replaced as desired by the user.

The table leg assembly of the present disclosure includes a plurality of leg members that each include an upper end that is connected to the table top of the table. A lower end of each leg member is open and provides access to an open interior of the leg member.

A tube end insert is received within the open interior at the lower end of each of the leg members. The tube insert includes an opening that provides access to an internal passage formed within the tube end insert. When the tube end insert is received within the open interior at the lower end of each of the leg members, the tube end insert can selectively receive either a caster wheel assembly or a glide assembly. The caster wheel assembly and the glide assembly can be selectively used on either all of the leg members of a table or on a selected number of leg members of the table.

The caster wheel assembly includes one or more caster wheels attached to a mounting block. An attachment rod extends from the mounting block. The attachment rod is designed to be received within the opening formed within the tube end insert. In one embodiment of the present disclosure, the attachment rod is threaded such that the threaded attachment rod is received within internal threads formed in the opening of the tube end insert.

The glide assembly includes a support foot that is attached to an attachment rod. In one embodiment of the disclosure, the attachment rod includes external threads such that the attachment rod can be received within the opening formed in the tube end insert. The glide assembly further includes a spacer having an internal passage sized to be received along the attachment rod of the glide member. The spacer is selectively movable along the length of the attachment rod of the glide member. In an embodiment in which the attachment rod is threaded, the internal passage of the spacer also includes mating threads. The spacer is selectively movable along the length of the attachment rod of the glide member. When the glide member is in a desired vertical position, the spacer can be moved into contact with the tube end insert to secure the glide member in a desired vertical position.

As indicated above, the caster wheel assembly and the glide assembly are selectively mounted to each of the plurality of leg members through the interaction between the attachment rod and the tube end insert. In this manner, the caster wheel assembly and the glide assembly can be selectively removed and replaced from the leg member as desired. Both the caster wheel assembly and the glide assembly can be vertically adjusted to maintain a desired height of the table.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 3 is a magnified, exploded view of the tube end insert and leg member;

FIG. 4 is an exploded view of both the caster wheel assembly and glide assembly as removed from the leg member;

FIG. 5 is a section view taken along line 5-5 of FIG. 2;

FIGS. 6A-6C illustrate the installation and adjustment of the glide assembly; and FIGS. 7A-7C illustrate the installation and adjustment of the caster wheel assembly.

DETAILED DESCRIPTION

Figure 1:
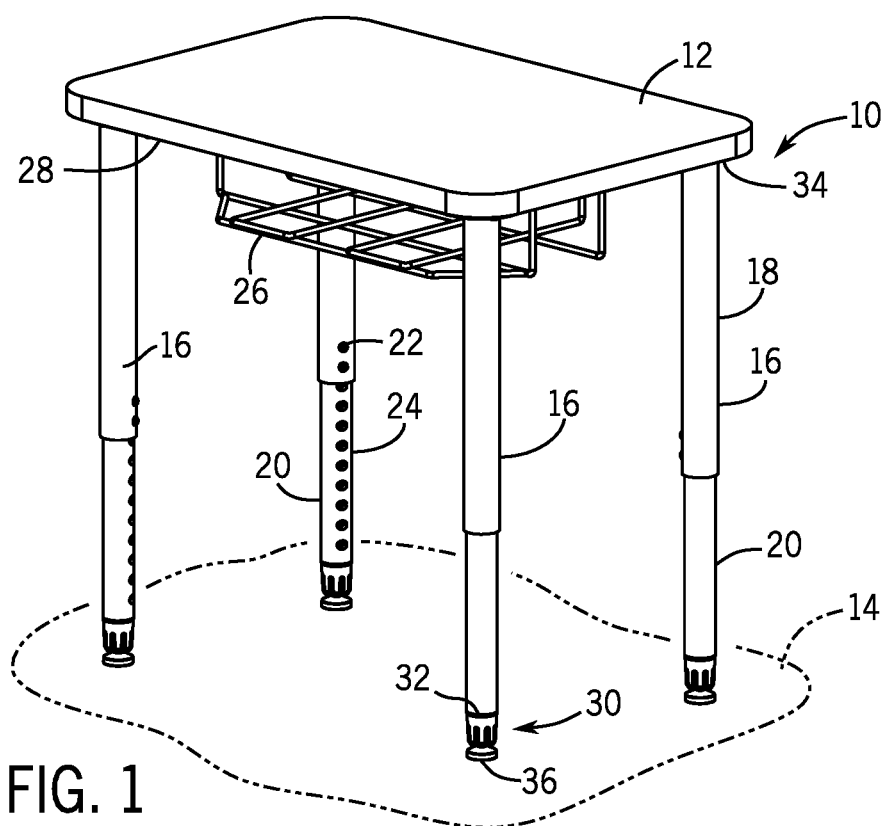
FIG. 1 is a front perspective view of a table including a table leg assembly in accordance with the present disclosure.

FIG. 1 illustrates a table 10 that includes a table top 12 supported above a floor 14 by a series of leg members 16. In the embodiment shown in FIG. 1, each of the leg members 16 includes an upper tube 18 and a lower tube 20. The lower tube 20 is extendable into and out of the upper tube 18 to adjust the overall length of the leg member 16. One or more connectors 22 extend through the outer surface of the upper tube 18 and are each received within one of a plurality of mounting holes 24 formed in the lower tube 20. In this manner, the overall height of each of the leg members 16 can be selected based upon the desired height of the table top 12 relative to the floor 14. In the embodiment shown in FIG. 1, a storage basket 26 is mounted to a lower surface 28 of the table top 12. However, the table 10 does not need to include the storage basket 26 while still operating within the scope of the present disclosure.

In the embodiment shown in FIG. 1, each of the leg members 16 includes a glide assembly 30 mounted to a lower end 32 of the leg member 16. An upper end 34 of the leg member 16 is securely mounted to the lower surface 28 of the table top 12. The glide assembly 30 generally includes a glide 36 that contacts the floor 14. The distance the glide 36 extends below the lower end 32 of the leg member 16 can be adjusted to stabilize the table 10.

Figure 2:
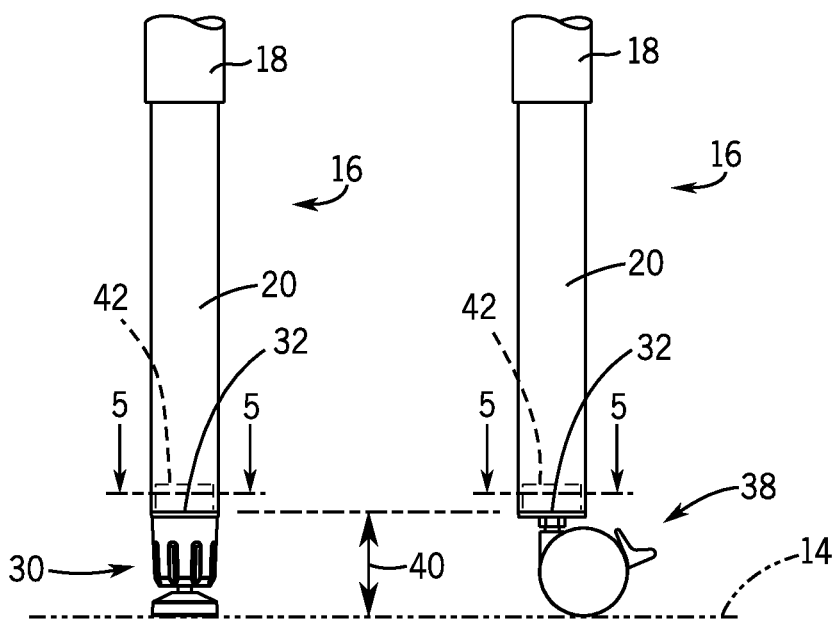
FIG. 2 is a side view illustrating the use of both a caster wheel assembly and a glide assembly as part of the table leg assembly.

Referring now to FIG. 2, each of the leg members 16 can receive either the glide assembly 30 or a caster wheel assembly 38. As illustrated in FIG. 2, both the glide assembly 30 and caster wheel assembly 38 extend below the lower end 32 of the leg member 16 and are adjustable such that the height 40 of the lower end 32 of the leg member 16 from the floor 14 is the same for a leg member 16 including either the glide assembly 30 or the caster wheel assembly 38. Both the glide assembly 30 and the caster wheel assembly 38 are selectively removable and can be replaced with either other. Both the glide assembly 30 and the caster wheel assembly 38 are received within a tube end insert 42, as will be described in greater detail below.

Referring now to FIG. 3, the lower end 32 of the lower tube 20 of the leg member 16 defines an open interior 44 that is surrounded by an inner surface 46. The open interior 44 defined by the inner surface 46 is sized to receive the tube end insert 42. The tube end insert 42 provides a mounting platform for the glide assembly 30 or the caster wheel assembly 38 as indicated above. The tube end insert 42 includes a flat, lower face 48 defined by an outer edge 50. The outer edge 50 has an outer diameter that is slightly larger than the outer diameter of the lower end 32 of the leg member such that the outer edge 50 contacts the bottom edge 52 of the lower tube 20 to prevent the tube end insert 42 from completely entering into the open interior 44.

The tube end insert 42 includes a plurality of engagement fins 54 that each include an axial contact surface 56. The axial contact surface 56 extends perpendicular to the lower face 48. The axial contact surfaces define a diameter that is slightly larger than the internal diameter of the open interior 44 such that the contact surfaces 56 frictionally engage the inner surface 46 of the lower tube 20 to hold the tube end insert 42 in position at the lower end 32. In the embodiment of the tube end insert 42 shown, the tube end insert is formed from a resilient plastic material that can slightly deform during the insertion of the tube end insert 42 into the lower end 32. As stated above, the outer edge 50 provides a physical stop surface to limit the axial movement of the tube end insert 42 into the open interior 44.

The tube end insert 42 includes an opening 58 centered within the lower face 48. The opening 58 extends along the entire axial height of the tube end insert 42 from the lower face 48 to the top end 60, as is best shown in FIG. 5. The opening 58 can either be slightly tapered from the opening at the lower face 48 to the top end 60 or, as is shown in the preferred embodiment, can include internal threads. The internal threads can extend the entire height of the opening 58 or can be included along only a portion of the height of the tube end insert 42. In the embodiment shown, the entire tube end insert 42 is formed from a resilient plastic material, although other materials, are contemplated as being with the scope of the present disclosure.

As illustrated in FIG. 5, the plurality of engagement fins 54 are sized such that the axial contact surface 56 of each fin 54 contacts and frictionally engages the inner surface 46 of the lower tube 20 of the leg member. The series of engagement fins 54 are spaced along the exterior of the tube end insert 42 to frictionally retain the tube end insert 42 in the position as shown.

FIG. 4 illustrates the remaining components of both the glide assembly 30 and the caster wheel assembly 38, which are each installed within the same tube end insert 42. As illustrated in FIG. 4, both the caster wheel assembly 38 and the glide assembly 30 can be selectively utilized with the tube end insert 42 to change the type of support for each of the individual leg members.

The glide assembly 30 further includes a glide member 62 having a support foot 64 securely attached to an attachment rod 66. The underside of the support foot 64 will typically include a smooth, nylon surface that allows the support foot 64 to slide along the floor. The attachment rod 66 in the embodiment shown in FIG. 4 includes external threads 68 that are designed to threadedly engage the internal threads formed in the opening 58 of the tube end insert 42. In a contemplated, alternate embodiment, the attachment rod 66 could be a smooth rod rather than including external threads. In such an embodiment, the attachment rod would then be frictionally received within the tube end insert 42.

The glide assembly 30 further includes a spacer 70. The spacer 70 is movable along the length of the attachment rod 66 and includes an outer surface 72 that extends from a top end 74 to a bottom end 76. The outer surface 72 provides for a decorative look to the glide assembly and cover a substantial portion of the threaded attachment rod 66. The outer surface 72 of the spacer 70 includes a series of ridges 78 that create a gripping surface for rotation of the spacer 70 along the externally threaded attachment rod 66. As is shown in FIG. 1, when the glide assembly 30 is used with the table leg member, the spacer 70 covers the attachment rod 66 and provides a clean visual look for the bottom of the leg member 16.

As best illustrated in FIG. 6A, the spacer 70 includes an internal passage 80 that extends from the top end 74 to the bottom end 76 of the spacer 70. In the embodiment illustrated, the internal passage 80 includes a threaded portion 82 that includes a series of internal threads that are designed to mate with the threaded outer surface of the attachment rod 66. In an alternate embodiment, the top end of the spacer 70 could include an internally threaded nut 84, such as is illustrated in FIG. 4. Either the threaded portion 82 or the nut 84 allows the spacer 70 to be rotated and thus move along the length of the attachment rod 66 of the glide member 62.

As indicated above, the attachment rod 66 could be designed to not include any threads. In such an embodiment, the internal passage 80 formed in the spacer 70 would also not include any internal threads. Instead, the internal passage 80 would be tapered and designed to frictionally engage the attachment rod to hold the spacer 70 in the desired location along the length of the attachment rod 66.

Referring back to FIG. 4, the caster wheel assembly 38 includes a pair of caster wheels 86 rotatably mounted to a mounting block 88. The mounting block 88, in turn, provides a secure point of attachment for an attachment rod 90. In the embodiment shown in FIG. 4, the attachment rod 90 includes a series of external threads 92 similar to the external threads 68 formed on the attachment rod 66 of the glide member 62. A nut 94 is positioned along the length of the attachment rod 90 and rotates with the rotation of the attachment rod 90 and can be moved along the length of the attachment rod 90 through rotation of the nut 94.

As indicated above, the attachment rod 90 could be designed to not include any external threads. In such an embodiment, the internal passage 80 formed in the spacer 70 would also not include any internal threads. Instead, the internal passage 80 would be tapered and designed to frictionally engage the attachment rod to hold the attachment rod 90. In yet another embodiment, the attachment rod 90 could include external threads and the internal passage 80 of the spacer 70 could be tapered to frictionally engage the attachment rod 90.

As discussed previously, either the glide assembly 30 or the caster wheel assembly 38 can be mounted to the leg member through the interaction between the respective attachment rod and the tube end insert 42. The interaction between the attachment rod and the internal opening formed in the tube end insert 42 allows the height of both the glide assembly 30 and the caster wheel assembly 38 to be modified to maintain a desired height 40 from the floor 14. In this manner, each leg of a table can selectively receive either the glide assembly 30 or the caster wheel assembly 38 and the height of each leg member adjusted to level the table top. The configuration of the glide assembly 30 and the caster wheel assembly 38 allow a table to include either assembly and be used with other tables including either assembly.

FIGS. 6A-6C illustrate the mounting and adjustment ability of the glide assembly 30. Initially, when the glide assembly 30 is to be installed, the spacer 70 is installed along the attachment rod 66. In an embodiment in which the attachment rod 66 includes internal threads, the spacer 70 is rotated in a counterclockwise direction to position the spacer 70 along the threaded rod 66 until the spacer 70 contacts the foot 64, as illustrated in FIG. 6B. Once the spacer 70 is installed on the attachment rod 66, the attachment rod 66 is then threadedly inserted into the opening 58 formed in the tube end insert 42. Rotation of the support foot 64 causes the attachment rod 66 to enter into the open interior of the leg member as illustrated in FIG. 6B. Once installed, the support foot 64 can be rotated in either the clockwise or counterclockwise direction to adjust the distance the support foot 64 extends below the lower end 32 of the table leg.

Once the height of the support foot 64 beneath the lower end 32 is set, as shown by arrow 40 in FIG. 6B, the spacer 70 is rotated to close the gap 96 between the top end 74 of the spacer 70 and the lower face 48 of the tube end insert 42. The spacer 70 is rotated until the top end 74 contacts the lower face 48, thereby locking the height 40 of the glide assembly in place as shown in FIG. 6C.

FIGS. 7A-7C illustrate the installation of the caster wheel assembly 38 onto the same leg member. As described previously, the caster wheel assembly 38 includes one or more caster wheels mounted to a mounting block 88. The mounting block 88 includes the threaded attachment rod 90. To install the caster wheel assembly 38 on one of the leg members, the threaded attachment rod 90 is inserted into the threaded internal opening 58 of the tube end insert 42. The caster wheel assembly 38 is rotated until the caster wheel reaches the desired height 40 from the lower end 32 of the leg member, as shown in FIG. 7C. As can be understood in the comparisons of FIGS. 6C and 7C, the overall height 40 from the lower end 32 of the leg member is the same for both the glide assembly 30 and the caster wheel assembly 38.

As can be understood by the above description, the caster wheel assembly 38 and the glide assembly 30 can be selectively used on any of the leg members of the table 10. The ability to replace the glide assembly 30 with a caster wheel assembly 38 while maintaining the same overall height of the table allows each of the tables to be selectively configured and allows different tables having one of the two assemblies to be utilized with each other.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A table leg assembly for supporting a table top above a floor, comprising:
   a plurality of leg members each having an upper end connectable to the table top and a lower end opposite the upper end, the lower end defining an open interior;
   a tube end insert received at the lower end of each of the leg members, the tube end insert including an opening that extends into the open interior of the leg member;
   a caster wheel assembly including a caster wheel and an attachment rod, wherein the attachment rod is receivable within the opening of the tube end insert;
   a glide assembly comprising:
   a glide member including a support foot and an attachment rod extending from the support foot;
   a spacer including an internal passage, wherein attachment rod of the glide member is received within the internal passage of the spacer such that the spacer is selectively movable along a length of the attachment rod of the glide member, wherein the attachment rod of the glide assembly is receivable within the opening of the tube end insert,
   wherein the tube end insert of each of the plurality of leg members can selectively receive either the caster wheel assembly or the glide assembly.

2. The table leg assembly of claim 1 wherein the spacer is movable along the attachment rod and into contact with the tube end insert to retain a vertical position of the glide member when the glide assembly is received on the leg member.

3. The table leg assembly of claim 1 wherein the internal passage of the spacer is frictionally retained along the length of the attachment rod of the glide member.

4. The table leg assembly of claim 1 wherein the attachment rods of the caster wheel assembly and the glide assembly include external threads that are retained within the opening of the tube end insert and movable relative to the tube end insert to adjust the height of the table top.

5. The table leg assembly of claim 1 wherein the spacer includes an outer surface having a diameter equal to the diameter of the lower end of the leg member.

6. The table leg assembly of claim 1 wherein the tube end insert includes an outer surface that frictionally engages an inner surface of the lower end of the leg member to retain the tube end insert within the leg member.

7. The table leg assembly of claim 1 wherein the internal passage formed in the spacer includes an internal taper such that the internal passage frictionally engages the attachment rod of the glide member to secure the spacer at a selected location along the length of the attachment rod.

8. A table leg assembly for supporting a table top above a floor, comprising:
   a plurality of leg members each having an upper end connectable to the table top and a lower end opposite the upper end, the lower end defining an open interior;

a tube end insert received at the lower end of each of the leg members, the tube end insert including a threaded opening that extends into the open interior of the leg member;

a caster wheel assembly including a caster wheel and a threaded attachment rod, wherein the attachment rod is receivable within the threaded opening of the tube end insert;

a glide assembly comprising:
- a glide member including a support foot and a threaded attachment rod extending from the support foot;
- a spacer including a threaded internal passage, wherein attachment rod of the glide member is received within the internal passage of the spacer such that the spacer is selectively movable along a length of the attachment rod of the glide member, wherein the attachment rod of the glide assembly is receivable within the threaded opening of the tube end insert, wherein the tube end insert of each of the plurality of leg members can selectively receive either the caster wheel assembly or the glide assembly.

9. The table leg assembly of claim 8 wherein the threaded attachment rod of the glide member is rotatable within the threaded opening of the tube end insert to adjust the distance of the support foot from the lower end of the leg.

10. The table leg assembly of claim 8 wherein the threaded attachment rods of the caster wheel assembly and the glide assembly are rotatable relative to the tube end insert to adjust the height of the table top.

11. The table leg assembly of claim 8 wherein the spacer includes an outer surface having a diameter equal to the diameter of the lower end of the leg member.

12. The table leg assembly of claim 8 wherein the tube end insert includes an outer surface that frictionally engages an inner surface of the lower end of the leg member to retain the tube end insert within the leg member.

13. The table leg assembly of claim 8 wherein the spacer is rotatable relative to the attachment rod of the glide member to adjust the position of the spacer along the attachment rod.

14. A table height adjustment system for use on each of a plurality of leg members of a table including a table top, each leg member including a lower end defining an open interior, comprising:

a tube end insert configured to be received at the lower end of each of the leg members, the tube end insert including a threaded opening;

a caster wheel assembly including a caster wheel and a threaded attachment rod, wherein the attachment rod is receivable within the threaded opening of the tube end insert;

a glide assembly comprising:
- a glide member including a support foot and a threaded attachment rod extending from the support foot;
- a spacer including a threaded internal passage, wherein attachment rod of the glide member is received within the internal passage of the spacer such that the spacer is selectively movable along a length of the attachment rod of the glide member, wherein the attachment rod of the glide assembly is receivable within the threaded opening of the tube end insert, wherein the tube end insert of each of the plurality of leg members can selectively receive either the caster wheel assembly or the glide assembly.

15. The table height adjustment system of claim 14 wherein the threaded attachment rod of the glide member is rotatable within the threaded opening of the tube end insert to adjust the distance of the support foot from the lower end of the leg.

16. The table height adjustment system of claim 14 wherein the threaded attachment rods of the caster wheel assembly and the glide assembly are rotatable relative to the tube end insert to adjust the height of the table top.

17. The table height adjustment system of claim 14 wherein the spacer includes an outer surface having a diameter equal to the diameter of the lower end of the leg member.

18. The table height adjustment system of claim 14 wherein the tube end insert includes an outer surface that frictionally engages an inner surface of the lower end of the leg member to retain the tube end insert within the leg member.

19. The table height adjustment system of claim 14 wherein the spacer is rotatable relative to the attachment rod of the glide member to adjust the position of the spacer along the attachment rod.

* * * * *